(12) United States Patent
Lin et al.

(10) Patent No.: US 9,285,548 B2
(45) Date of Patent: Mar. 15, 2016

(54) RATTLE FREE METAL CLIP FOR OPTICAL FIBER ADAPTER

(75) Inventors: Sung An Lin, Miaoli County (TW); Sung Chi Lin, Miaoli County (TW)

(73) Assignee: EZONTEK TECHNOLOGIES CO., LTD., New Taipei (TW)

( * ) Notice: Subject to any disclaimer, the term of this patent is extended or adjusted under 35 U.S.C. 154(b) by 805 days.

(21) Appl. No.: 13/419,563

(22) Filed: Mar. 14, 2012

(65) Prior Publication Data

US 2013/0101257 A1 Apr. 25, 2013

(30) Foreign Application Priority Data

Oct. 25, 2011 (TW) ............................. 100138626 A

(51) Int. Cl.
*G02B 6/38* (2006.01)

(52) U.S. Cl.
CPC ................................. *G02B 6/3825* (2013.01)

(58) Field of Classification Search
None
See application file for complete search history.

(56) References Cited

U.S. PATENT DOCUMENTS

| | | | | |
|---|---|---|---|---|
| 4,167,303 A | * | 9/1979 | Bowen | G02B 6/4292 385/59 |
| 6,186,670 B1 | * | 2/2001 | Austin | G02B 6/3825 385/55 |
| 6,212,324 B1 | * | 4/2001 | Lin et al. | 385/136 |
| 6,712,521 B1 | * | 3/2004 | Koreeda | 385/56 |
| 6,953,285 B2 | * | 10/2005 | Mickievicz | G02B 6/3878 385/53 |
| 7,985,027 B2 | * | 7/2011 | Lewallen | G02B 6/3831 385/60 |
| 8,478,094 B2 | * | 7/2013 | Hsu | G02B 6/4214 385/47 |
| 2003/0100204 A1 | | 5/2003 | Hwang | |
| 2004/0223701 A1 | | 11/2004 | Tanaka et al. | |
| 2004/0264873 A1 | * | 12/2004 | Smith et al. | 385/53 |
| 2006/0115219 A1 | * | 6/2006 | Mudd | G02B 6/3887 385/62 |
| 2008/0267566 A1 | * | 10/2008 | En Lin | G02B 6/3825 385/53 |
| 2010/0278497 A1 | | 11/2010 | Hsu et al. | |
| 2011/0243711 A1 | * | 10/2011 | Vehr | F01D 5/187 415/115 |
| 2012/0057830 A1 | * | 3/2012 | Taira | G02B 6/3825 385/78 |
| 2014/0169727 A1 | * | 6/2014 | Veatch | G02B 6/3831 385/11 |

FOREIGN PATENT DOCUMENTS

| | | | |
|---|---|---|---|
| CN | 201060288 Y | | 5/2008 |
| JP | 2009265377 A | * | 11/2009 |
| JP | 2011133611 A | | 7/2011 |

\* cited by examiner

Primary Examiner — Tina Wong
(74) Attorney, Agent, or Firm — Hauptman Ham, LLP

(57) ABSTRACT

A clip for an optical fiber adapter according to the present disclosure includes a horizontal portion, two vertical portions, two elastic stopping portions and an elastic sheet. The vertical portions extend downward from the horizontal portion. The elastic stopping portions extend from the vertical portions, respectively. The elastic sheet extends upward from the horizontal portion.

13 Claims, 6 Drawing Sheets

RATTLE FREE METAL CLIP FOR OPTICAL FIBER ADAPTER

CROSS REFERENCE TO RELATED APPLICATION

This application claims the priority benefit of Taiwan Patent Application Serial Number 100138626 filed Oct. 25, 2011, the full disclosure of which is incorporated herein by reference.

BACKGROUND OF THE INVENTION

1. Field of the Invention

The present invention relates to an optical fiber adapter, and more particularly, to an optical fiber adapter with a rattle-free metal clip.

2. Description of the Related Art

Referring to FIG. 1, an optical fiber adapter 100 with a conventional clip includes a molded main body 110 and a metal clip 150. The main body 110 is of rectangular shape and has an axial accommodation room 115 defined by a top side-wall 111, a bottom side-wall 112, a right side-wall 113 and a left side-wall 114. A recess 116 is formed on each of the top side-wall 111, the right side-wall 113 and the left side-wall 114. These recesses 116 are positioned in communication with each other. In addition, a pair of tabs 119 extends outward from the right side-wall 113 and the left side-wall 114.

The clip 150 made of metal includes two vertical portions 154 extending downward from two opposing ends of a horizontal portion 152, wherein the horizontal portion 152 is positioned in the recess 116 on the top side-wall 111 and the two vertical portions 154 are positioned in the recesses 116 on the right side-wall 113 and the left side-wall 114, respectively. The vertical portions 154 are generally rectangular and each of them has a rectangular opening 155. An elastic stopping portion 158 extends from a side 157 of the opening 155. The stopping portions 158 are generally rectangular and extend outward and toward the tabs 119 on the main body 110, respectively.

Referring to FIGS. 3a and 3b, when desiring to mount the above optical fiber adapter 100 on a panel 210, the stopping portions 158 of the clip 150 attached to the main body 110 are passed through an opening 212 on the panel 210 and the tabs 119 are brought into contact with the panel 210. After the stopping portions 158 have passed through the opening 212, a pull on the main body 110 will cause the rear ends of the stopping portions 158 to be in contact with the rear side of the panel 210. This may prevent the main body 110 from being pulled out of the panel 210.

In order to mount the optical fiber adapter 100 on the panel 210, the opening 212 should be slightly larger than the cross-section of the main body 110. However, this may cause the main body 110 to rattle on the panel 210.

Accordingly, there exists a need to provide a solution to solve the aforesaid problems.

SUMMARY OF THE INVENTION

The present disclosure provides a clip for an optical fiber adapter that may prevent the optical fiber adapter from rattle on a panel.

In one embodiment, the clip of the present disclosure includes a horizontal portion, two vertical portions, two elastic stopping portions and an elastic sheet. The vertical portions extend downward from the horizontal portion. The elastic stopping portions extend from the vertical portions, respectively. The elastic sheet extends upward from the horizontal portion.

The present disclosure further provides an optical fiber adapter that includes a main body and the above clip. The main body has an accommodation room defined by a first wall, a second wall, a third wall and a fourth wall, wherein the first wall faces the third wall and connects with the second and fourth walls. The horizontal portion of the clip is positioned on the first wall and the vertical portions of the clip are positioned on the second and fourth walls, respectively.

According to the present disclosure, wherein the elastic sheet has a curved shape.

According to the present disclosure, wherein the elastic sheet has an opening. The clip further includes a tongue extending from a side of the opening.

According to the present disclosure, wherein the tongue extends toward a rear end of the elastic sheet.

According to the present disclosure, wherein the tongue has a rectangular shape.

The foregoing, as well as additional objects, features and advantages of the disclosure will be more readily apparent from the following detailed description, which proceeds with reference to the accompanying drawings.

DETAILED DESCRIPTION OF THE PREFERRED EMBODIMENT

Figure 1:
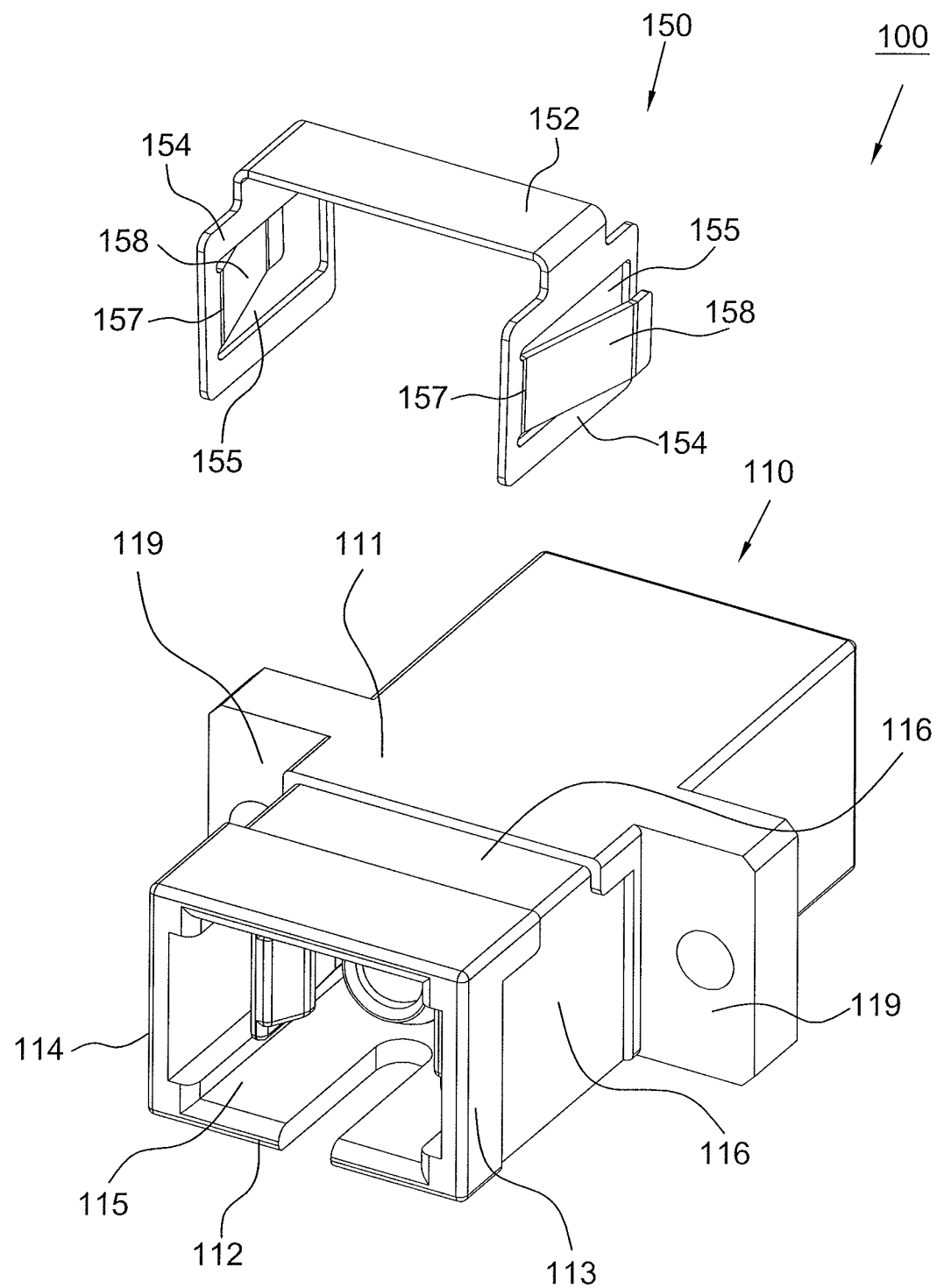
FIG. 1 is an elevated perspective view illustrating an optical fiber adapter with a conventional clip, wherein the clip is separated from the main body of the optical fiber adapter.
Figure 2:
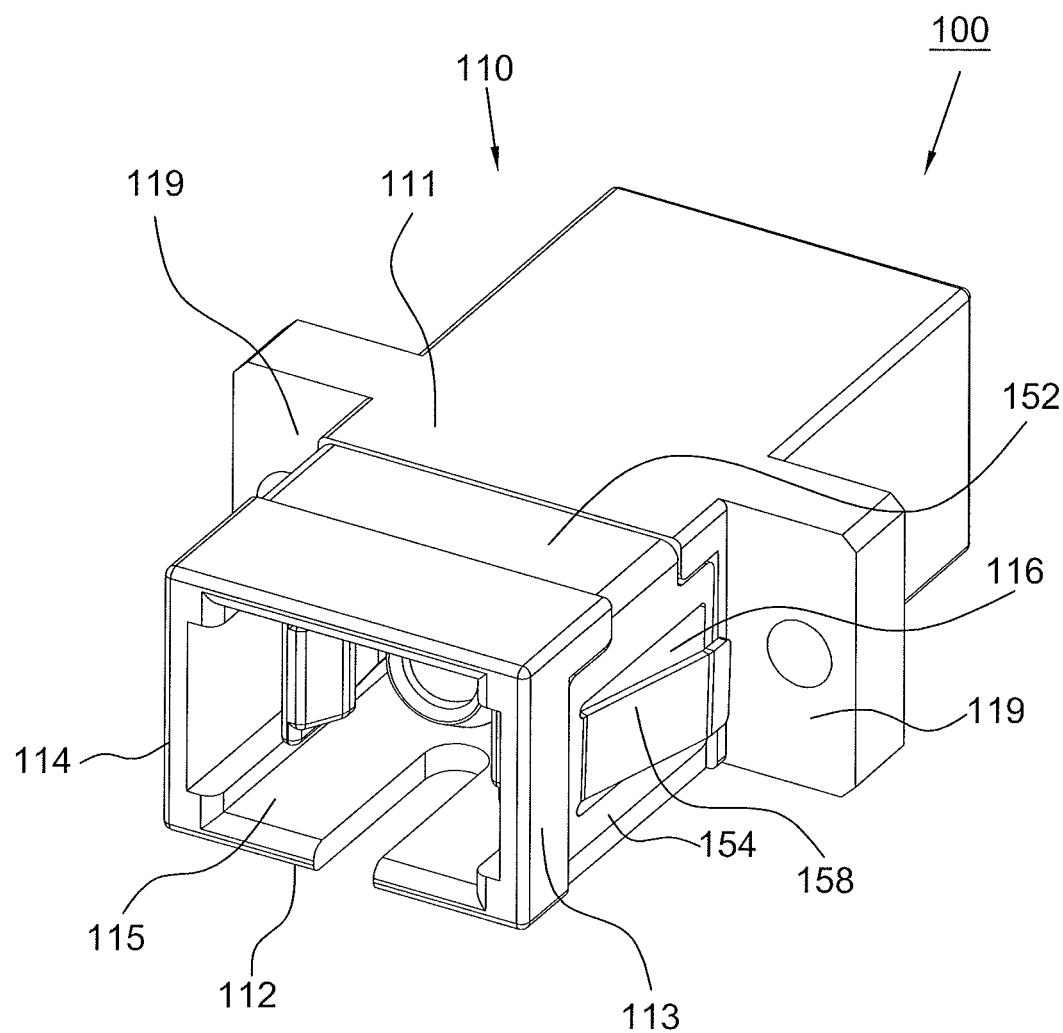
FIG. 2 is an elevated perspective view illustrating an optical fiber adapter with a conventional clip.
Figure 3A:
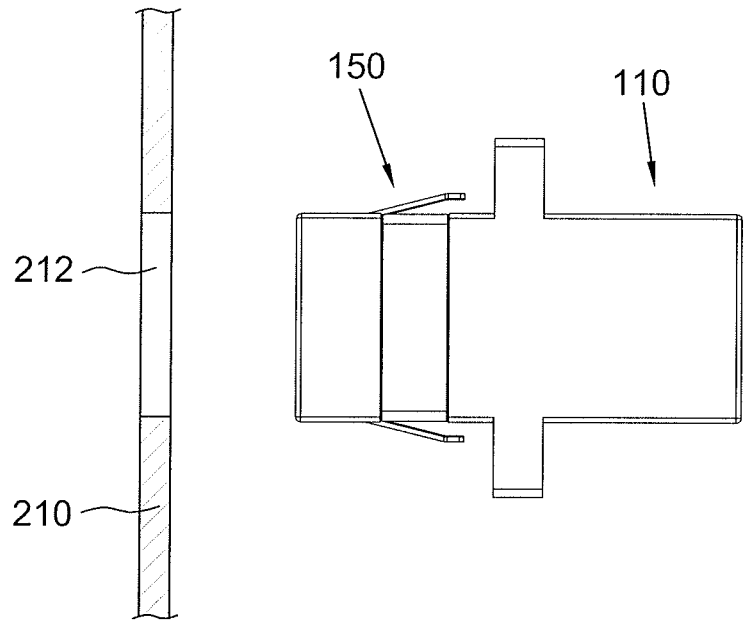
FIGS. 3a and 3b illustrate how to mount the optical fiber adapter of FIG. 2 on a panel.
Figure 3B:
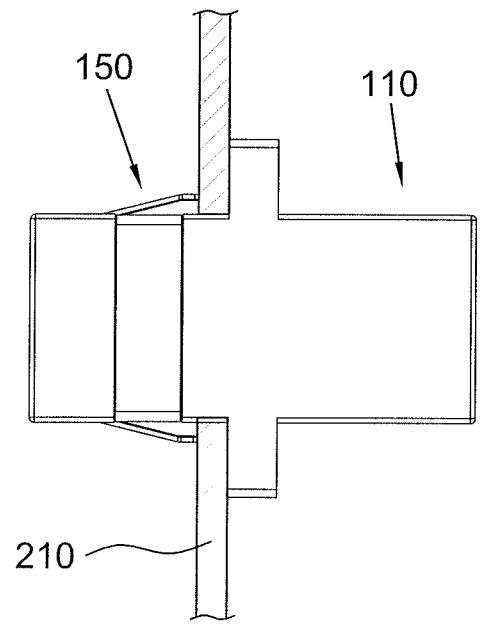
Figure 4:
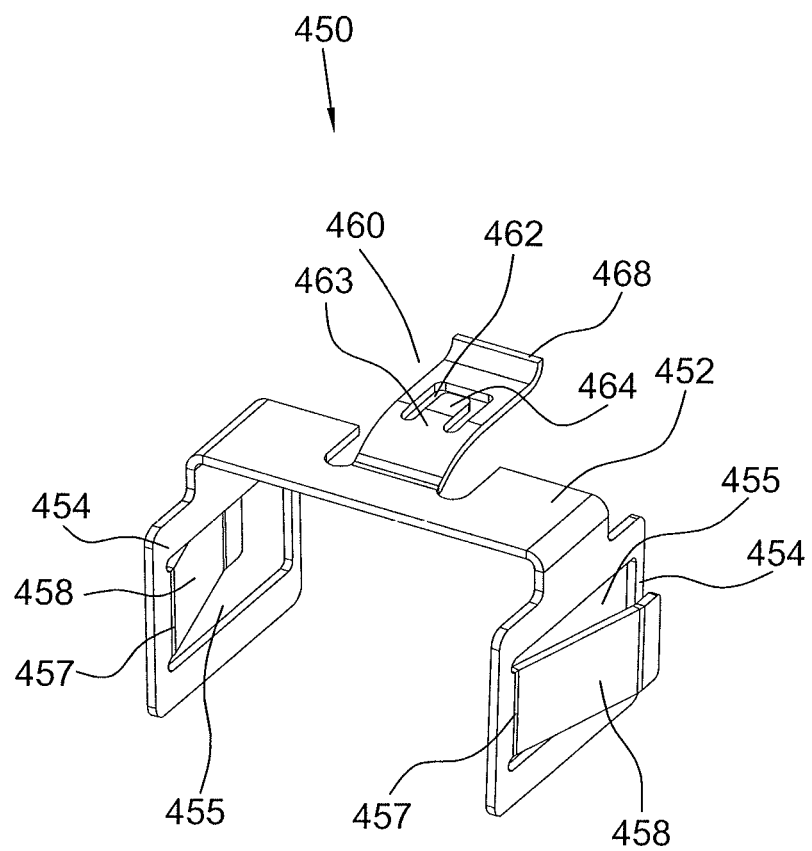
FIG. 4 is an elevated perspective view of the clip of the present disclosure.
Figure 5:
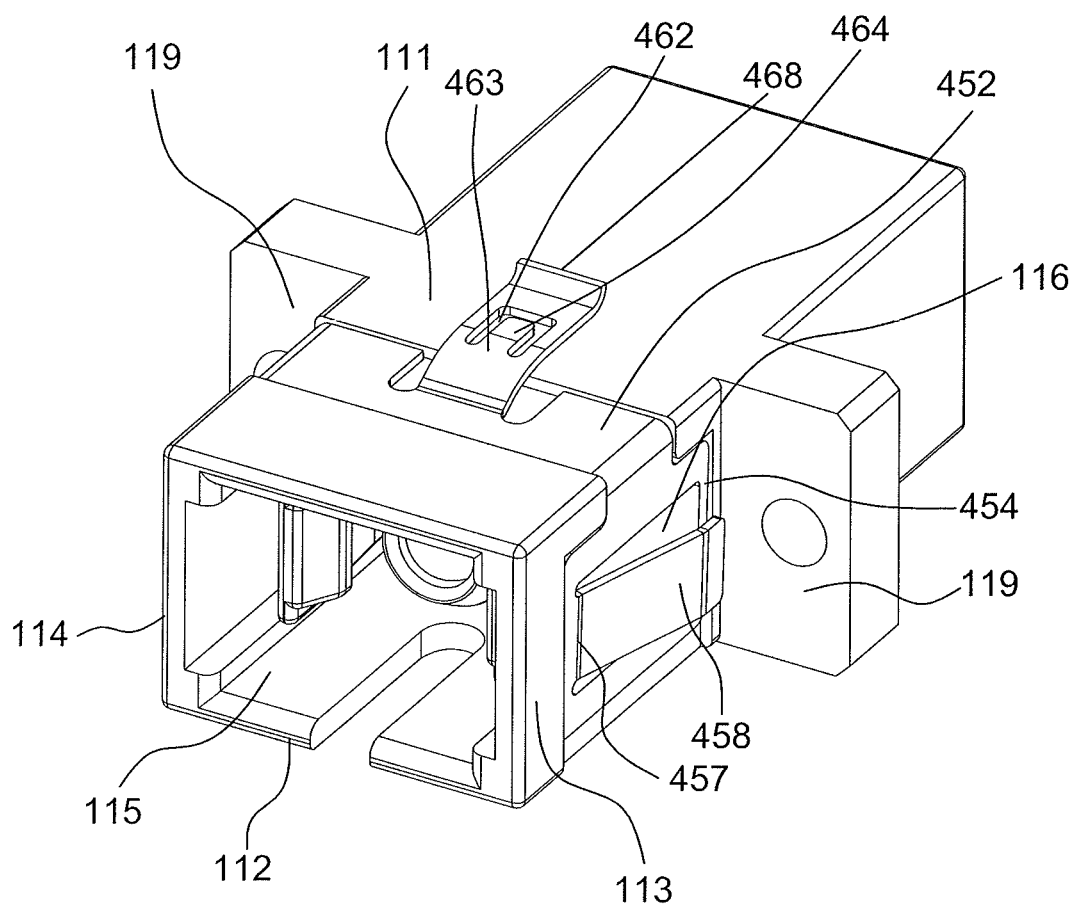
FIG. 5 is an elevated perspective view of the optical fiber adapter of the present disclosure.

Referring to FIGS. 4 and 5, the optical fiber adapter 400 according to the present disclosure includes the main body 110 of FIG. 1 and a clip 450. The clip 450 is made of metal and includes two vertical portions 454 extending downward from two opposing ends of a horizontal portion 452, wherein the horizontal portion 452 is positioned in the recess 116 on the top side-wall 111 and the two vertical portions 454 are positioned in the recesses 116 on the right side-wall 113 and the left side-wall 114, respectively. The vertical portions 454 are generally rectangular and each of the vertical portions 454 has a rectangular opening 455. An elastic stopping portion 158 extends from a side 457 of each of the openings 455. The stopping portions 458 are generally rectangular and extend outward and toward the tabs 119 on the main body 110, respectively. In addition, an elastic sheet 460 extends upward from the horizontal portion 452. The elastic sheet 460 is of curved shape and has a rectangular opening 462 thereon. A tongue 464 extends from a side 463 of the opening 462. The tongue 464 is generally rectangular and extends toward a rear end 468 of the elastic sheet 460.

Figure 6A:
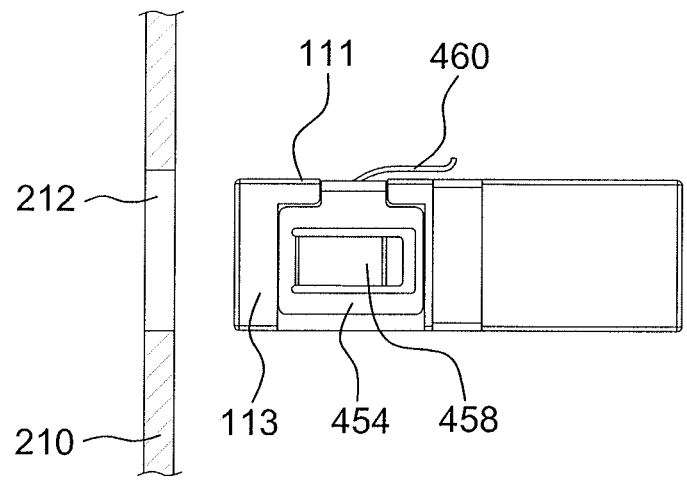
FIGS. 6a and 6b illustrate how to mount the optical fiber adapter of the present disclosure on a panel.
Figure 6B:
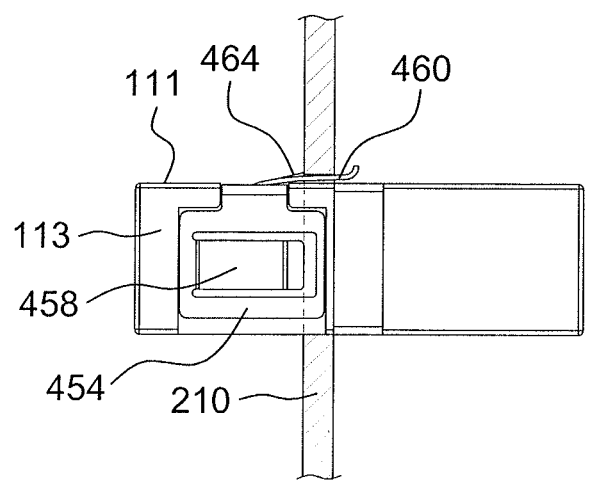

Referring to FIGS. 6a and 6b, when desiring to mount the optical fiber adapter 400 of the present disclosure on the panel 410, the stopping portions 458 of the clip 450 attached to the main body 110 are passed through the opening 212 of the panel 210 and the tabs 119 are brought into contact with the panel 210. After the stopping portions 458 have passed through the opening 212, a pull on the main body 110 will cause the rear ends of the stopping portions 458 to be in contact with the rear side of the panel 210. This may prevent the main body 110 from being pulled out of the panel 210. In addition, the elastic sheet 460 extending from the horizontal portion 452 will be pressed and be in contact with an inner surface of the opening 212.

According to the present disclosure, because the elastic sheet 460 is pressed and is in contact with the inner surface of the opening 212, the optical fiber adapter 400 will not rattle on the panel 210. In addition, the tongue 464 of the elastic sheet 460 may prevent the optical fiber adapter 400 from tilt on the panel 210.

Although the preferred embodiments of the disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A clip for an optical fiber adapter, the optical fiber adapter having a main body with an accommodation room defined by a first wall, a second wall, a third wall and a fourth wall, the first wall facing the third wall and connecting with the second and fourth walls, the clip comprising:
   a horizontal portion being configured to be positioned on an outer surface of the first wall of the main body, wherein the horizontal portion has two opposing sides;
   two vertical portions extending downward respectively from the opposing sides of the horizontal portion, wherein the vertical portions face each other and are configured to be positioned respectively on outer surfaces of the second and fourth walls of the main body;
   two elastic stopping portions respectively extending outward from the vertical portions, wherein the stopping portions extend away from each other; and
   an elastic sheet being configured to be positioned on the outer surface of the first wall of the main body, wherein the elastic sheet has opposing first and second ends, the first end is fixed at the horizontal portion and the second end is movable with respect to the first end, the elastic sheet continuously extends upward from the first end to the second end.

2. The clip as claimed in claim 1, wherein the elastic sheet has a curved shape.

3. The clip as claimed in claim 1, wherein the elastic sheet has an opening, the clip further comprising:
   a tongue being enclosed by the elastic sheet when seen in a plan view of the elastic sheet, said tongue extending from a side of the opening.

4. The clip as claimed in claim 3, wherein the tongue extends toward the second end of the elastic sheet.

5. The clip as claimed in claim 3, wherein the tongue has a rectangular shape.

6. The clip as claimed in claim 1, wherein each of the vertical portions has an opening, and the stopping portions respectively extend outward from sides of the openings of the vertical portions.

7. An optical fiber adapter, comprising:
   a main body having an accommodation room defined by a first wall, a second wall, a third wall and a fourth wall, the first wall facing the third wall and connecting with the second and fourth walls;
   two tabs being fixed at and extending outward from the second and fourth walls, respectively; and
   a clip, including:
      a horizontal portion being positioned on an outer surface of the first wall, wherein the horizontal portion has two opposing sides;
      two vertical portions extending downward respectively from the opposing sides of the horizontal portion, wherein the vertical portions face each other and are positioned on outer surfaces of the second and fourth walls, respectively;
      two elastic stopping portions respectively extending outward from the vertical portions, wherein the stopping portions extend away from each other and respectively toward the tabs; and
      an elastic sheet being positioned on the outer surface of the first wall, wherein the elastic sheet has opposing first and second ends, the first end is fixed at the horizontal portion and the second end is movable with respect to the first end, the elastic sheet continuously extends upward from the first end to the second end.

8. The optical fiber adapter as claimed in claim 7, wherein the elastic sheet has a curved shape.

9. The optical fiber adapter as claimed in claim 7, wherein the elastic sheet has an opening, the clip further comprising:
   a tongue being enclosed by the elastic sheet when seen in a plan view of the elastic sheet, said tongue extending from a side of the opening.

10. The optical fiber adapter as claimed in claim 9, wherein the tongue extends toward the second end of the elastic sheet.

11. The optical fiber adapter as claimed in claim 9, wherein the tongue has a rectangular shape.

12. The optical fiber adapter as claimed in claim 7, wherein a plurality of recesses is formed on the first, second and fourth walls, respectively, and the horizontal portion and the vertical portions are positioned in the recesses, respectively.

13. The optical fiber adapter as claimed in claim 7, wherein each of the vertical portions has an opening, and the stopping portions respectively extend outward from sides of the openings of the vertical portions.

* * * * *